G. H. BILLINGS.

MACHINES FOR COLD-DRAWING RODS AND SHAFTING.

No. 7,868. Reissued Sept. 4, 1877.

Witnesses.

H. J. Pratt.

E. C. Perkins.

Inventor.

George H. Billings by Crosby & Gregory

Attys

N. PETERS, PHOTO-LITHOGRAPHER, WASHINGTON, D. C.

UNITED STATES PATENT OFFICE.

GEORGE H. BILLINGS, OF BOSTON, MASSACHUSETTS.

IMPROVEMENT IN MACHINES FOR COLD-DRAWING RODS AND SHAFTING.

Specification forming part of Letters Patent No. 130,465, dated August 13, 1872; Reissue No. 7,868, dated September 4, 1877; application filed July 17, 1877.

*To all whom it may concern:*

Be it known that I, GEORGE H. BILLINGS, of Boston, in the county of Suffolk and State of Massachusetts, have invented an Improved Machine for the Manufacture of Cold-Drawn Rods, Shafting, &c., of which the following is a specification:

The invention relates to machines employed in the manufacture of cold-drawn rods for shafting and other purposes; and consists in the employment, with mechanism to draw a rod, of a self-centering die, whereby the passage in the die through which the rod is drawn is always kept central with the movement of the clamp or mechanism which draws the rod through the die. This self-centering die insures the formation of a true and uniform rod, free from bends and irregularities.

Figure 1:
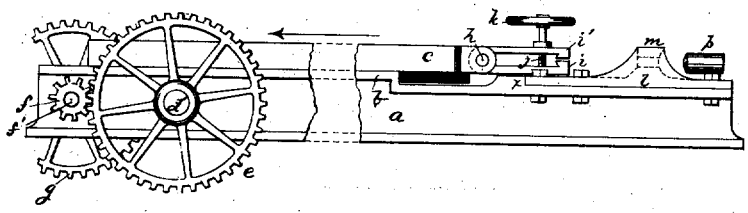
Figure 2:
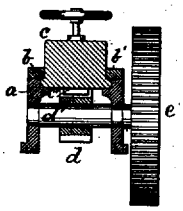
Figure 3:
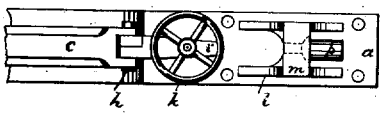
Figure 4:
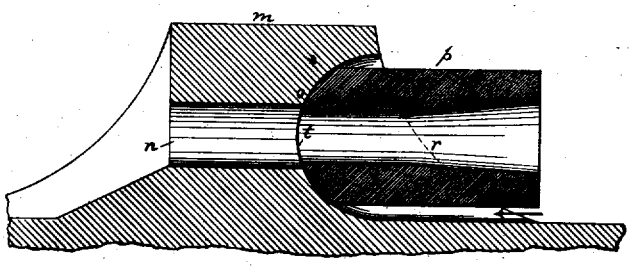

Figure 1 represents, in side elevation, a machine embodying my invention, the die being advanced from its seat, and the central portion of the frame and part of the gearing being broken away; Fig. 2, a transverse section taken on the line *x x*, Fig. 1; Fig. 3, a plan view of that end of the machine provided with the die, the latter being in position, and Fig. 4 is an enlarged vertical section, showing the self-centering die in operative position.

The frame *a* of the machine is usually from forty to sixty feet in length, and made stout enough to resist the strain to which it is subjected. This frame has guides *b b'* to direct a carriage or draw-bar, *c*, provided with a rack, *c'*, which is engaged by a pinion, *d*, on the driving-shaft *d'*. This shaft has a toothed wheel, *e*, which is engaged and moved by a pinion, *f*, on a shaft, *f'*, driven through a toothed wheel, *g*, or by any other suitable mechanical device which will move the carriage with sufficient power.

The end of the draw-bar *c* most remote from the driving-gearing has pivoted to it at *h* two jaws, *i i'*, which are adapted to engage and hold the rod to be operated upon, a screw, *j*, and hand-wheel *k* being shown, by which to clamp the jaws upon such rod.

The frame is provided with a shoulder at *x*, to serve as an abutment for a bed-plate, *l*, which is furnished with a bridge, *m*, having a concave seat or socket, *o*, and a bore or passage, *n*. In front of this socket is the self-centering die *p*, made as a short cylinder of steel, and having, as shown, a convex end and a passage, *r*. The curvature of the end *t* corresponds with that of the socket *o*, in which the end *t* is adapted to rest. The passage *r* through the die is partially conical and partially cylindrical, the conical or receiving end of the passage being somewhat larger than the rod to be drawn, and the cylindrical portion being of the size of the finished rod.

The passage *n* in the bridge may be of any suitable dimensions, as it performs no function in the operation of drawing the rod.

The operation of the machine is as follows: One end of the rod to be drawn is first reduced in diameter, so that it may readily pass through the passage *r* and is placed within such passage. The die *p* is supported in front of the socket. The reduced end of the rod protruded beyond the die and bridge is then inserted between the jaws, where it is securely clamped, after which the carriage is put in motion so as to pull the rod in the direction of the arrow, Fig. 1, thereby drawing the rod or bar through the die and subjecting it to intense circumferential compression, which serves to condense the fibers of the rod and thus add greatly to its rigidity.

The conical portion of the passage through the die causes the gradual compression of the rod, so that the rod is not liable to break or the die to burst.

The specially advantageous feature and peculiarity of this my machine consists in the employment of a self-centering die so constructed and sustained as to always present its axis in line with the center of the clamp, no matter how much said clamp may vibrate in any direction.

This die and its passage are always maintained directly in line with the power employed to draw the rod or bar through the die, and the rod or die is consequently drawn straight and of uniform diameter ready for use without other finishing or manipulation. The convex head *t* adapts itself to the concave seat *o*.

Whenever the reducing-die is a fixture in the machine the rod will always be more or less sprung, on account of its being impossible to adjust the clamp so as to maintain the rod directly in line with said die, and the rod, after being taken from the machine, must be straightened by special appliances, which is an expensive and unsatisfactory operation, as the rod is frequently indented or otherwise injured.

The machine may be employed for reducing rods for shafting, sash-iron, fender-work, or for any other purpose, where a true and finished rod or bar is required. Before being drawn the rod may be tinned, zinced, or nickel-plated.

I claim—

1. In a machine to cold-draw rods and shafting, a self-centering die through which a rod or shaft may be drawn to consolidate its fibers, substantially as and for the purpose described.

2. The combination, with a self-centering die provided with a central passage, of a clamp to hold the rod and mechanism whereby the rod may be drawn through the die, substantially as described.

3. The combination, with a self-centering die having a convex end, of a concave seat to sustain the die and permit it to move easily on the seat, substantially as described.

GEORGE H. BILLINGS.

Witnesses:

G. W. GREGORY,

W. J. PRATT.